(12) United States Patent
Singh (10) Patent No.: US 7,152,083 B2
(45) Date of Patent: Dec. 19, 2006

(54) JERK LIMITED TIME DELAY FILTER

(75) Inventor: Tarunraj Singh, Williamsville, NY (US)

(73) Assignee: The Research Foundation of State University of New York, Amherst, NY (US)

( * ) Notice: Subject to any disclaimer, the term of this patent is extended or adjusted under 35 U.S.C. 154(b) by 481 days.

(21) Appl. No.: 10/660,219

(22) Filed: Sep. 11, 2003

(65) Prior Publication Data

US 2004/0049527 A1    Mar. 11, 2004

Related U.S. Application Data

(60) Provisional application No. 60/409,725, filed on Sep. 11, 2002.

(51) Int. Cl.
*G06F 17/10* (2006.01)
(52) U.S. Cl. ........................................... 708/300
(58) Field of Classification Search ................ 708/300; 700/12, 13
See application file for complete search history.

(56) References Cited

U.S. PATENT DOCUMENTS 3,785,463 A * 1/1974 Kuhl et al. ................. 187/295
4,916,635 A    4/1990 Singer et al.
5,035,301 A    7/1991 Skalski
5,331,264 A    7/1994 Cheng et al.
5,610,848 A    3/1997 Fowell
6,078,844 A    6/2000 Magee et al.
6,320,721 B1 * 11/2001 Magee et al. ............ 360/78.06
6,552,507 B1 *  4/2003 Miyazawa ............. 318/568.11

OTHER PUBLICATIONS

*International Search Report* corresponding to PCT/US03/28411.

* cited by examiner

*Primary Examiner*—Chuong D. Ngo
(74) *Attorney, Agent, or Firm*—Hodgson Russ LLP (57) ABSTRACT

The invention includes a method of determining a control input. Such a control input may be used to dictate an input to a system, in order to bring the system from one state to another. In a method according to the invention, a set of values may be determined. The values in the set may be a solution to each of (a) a jerk parameter equation, (b) a first constraint equation and (c) a second constraint equation. The set of values may be used to determine a corresponding transfer function. The transfer function may be coupled with a filter to provide an augmented transfer function. The augmented transfer function may then be used to act upon an input signal in order to produce a control input.

21 Claims, 5 Drawing Sheets

JERK LIMITED TIME DELAY FILTER

CROSS-REFERENCE TO RELATED APPLICATION

This application claims the benefit of priority to U.S. provisional patent application Ser. No. 60/409,725, filed on Sep. 11, 2002, now pending.

FIELD OF THE INVENTION

The present invention relates to control input signals used to bring a system from a first state to a second state.

SUMMARY OF THE INVENTION

The present invention includes a method of determining a control input signal (or simply, a "control input"). Such a control input may be used to bring a system from one state to another. In a method according to the invention, a set of values may be determined. The values in the set may be a solution to each of (a) a jerk parameter equation, (b) a first constraint equation and (c) a second constraint equation. The set of values may be used to determine a corresponding transfer function. The transfer function may be coupled with a filter to provide an augmented transfer function. An input signal may be acted upon according to the augmented transfer function to provide a control input that may be used to bring the system from a first state to a second state.

BRIEF DESCRIPTION OF THE DRAWINGS

For a fuller understanding of the nature and objects of the invention, reference should be made to the following detailed description taken in conjunction with the accompanying drawings, in which.

DETAILED DESCRIPTION OF THE INVENTION

The present invention includes a method of determining a control input. Such a control input may be used to bring the system from one state to another. For example, a control input may describe the acceleration of a read/write head in a computer hard drive as the head moves from a first location to a second location in order that the read/write head may read information from or write information to the second location. As another example, a control input may describe the acceleration of a flow rate of a substance added to or removed from a reactor in order that the reactor or the process occurring inside the reactor stays within desired limits. These examples are not intended to limit the invention, and in fact the invention may be applied to many other systems.

In describing embodiments of the invention, it is assumed that the system has been at the first state long enough so that the system can be described as steady. Further, in describing embodiments of the invention, it is assumed that it is desired that the system will ultimately be steady at the second state. However, the invention is not limited to situations where the first state is a steady state, nor is the invention limited to situations where the second state is a steady state.

Generally speaking, the invention may be used to limit or reduce the amount of oscillation present in the system when the system arrives at the second state. For example, the oscillation may be physical movement of a system component, or temperature oscillation, or pressure oscillation. The invention may be used on systems having a single mode or on systems having multiple modes. Further, the invention may be used on undamped as well as damped systems.

It is assumed that certain characteristics of the system are known. For example, the damping coefficient and the natural frequency of the system may need to be known. Further, it is assumed a jerk parameter "J" is known or may be selected. The jerk parameter is a measure of the time rate of change of acceleration corresponding to a component of the system during a maneuver to change a state of the system from a first state to a second state.

The invention is described herein with reference to pulses. Pulses are identified generally by the number "10", and when a specific pulse is identified, the number 10 will be combined with a letter, for example, "10C." Theoretically speaking, the pulses 10 may include steps, wherein a parameter of the system, such as for example the time rate of change of the acceleration of a system component, is adjusted instantaneously.

In a method according to the invention, a control input is determined. To do so, three equations may be determined. In a first one of the equations, a jerk parameter equation may be determined. The jerk parameter equation may be structured so that when the control input has been fully executed, the system reaches the second state. When the input signal is a unit step signal, the jerk parameter equation may be structured such that the value of the control input is equal to one at exactly the time execution of the control input is finished. For example, the jerk parameter equation may be the expansion of the following equation:

$$\sum_{i=0}^{N}(-1)^{i+1}T_i = \frac{1}{J}$$

where N is an odd integer, $T_i$ represents a particular instant in time and J is the jerk parameter. This jerk parameter equation may be thought of as defining a set of $T_i$ values such that the sum of a finite number of infinitely long signals, each signal beginning at a corresponding $T_i$, will equal 1/J. For example, when N equals three, the first signal has an amplitude of one and starts at $T_0$, the second a second signal has an amplitude of minus-one and starts at $T_1$, the third signal has an amplitude of one and starts at $T_2$, and the fourth signal has an amplitude of minus-one and starts at $T_3$.

The effect of the second signal is to cancel the first signal beginning at $T_1$, and the effect of the fourth signal is to cancel the effect of the third signal beginning at $T_3$. The result is a series of two finite pulses, wherein a first pulse 10A begins at $T_0$ and ends at $T_1$, and a second pulse 10B begins at $T_2$ and ends at $T_3$. The jerk parameter equation may identify the rate at which the acceleration of an input signal to a system will change in order to bring the system from the first state to the second state.

In a second one of the equations, a first constraint equation may be determined. The first constraint equation may be:

$$\sum_{i=0}^{N}(-1)^i \exp(-\sigma_k T_i)\cos(\omega_k T_i) = 0 \text{ for } k = 1, 2, 3, \ldots$$

where $\omega$ is the natural frequency of the system and $\sigma$ is the real part of the underdamped poles. The real part of the underdamped poles (y may be found from the following equation:

$$s_k = \sigma_k \pm j\omega_k \text{ for } k=1, 2, 3, \ldots$$

In a third one of the equations, a second constraint equation may be determined. The second constraint equation may be:

$$\sum_{i=0}^{N}(-1)^i \exp(-\sigma_k T_i)\sin(\omega_k T_i) = 0 \text{ for } k = 1, 2, 3, \ldots$$

These constraint equations serve to cancel the undamped or under-damped poles of the system.

A set of $T_i$ values may be determined. The set of $T_i$ values provides a solution for each of (a) the jerk parameter equation, (b) the first constraint equation and (c) the second constraint equation. A set of $T_i$ values may be determined by simultaneously solving the equations. There may be more than one set of $T_i$ values that satisfy the equations.

A set of $T_i$ values may be selected to provide a selected set. If only one set of $T_i$ values satisfies the three equations, then that set may be selected. However, if more than one set of $T_i$ values satisfies the three equations, then one of those sets may be selected.

The selected set may be used to determine a transfer function that corresponds to the selected set of $T_i$ values. In an embodiment of the invention, the transfer function results from the expansion of the following equation:

$$G(s) = \sum_{i=0}^{N}(-1)^i \exp(-sT_i)$$

Figure 1:
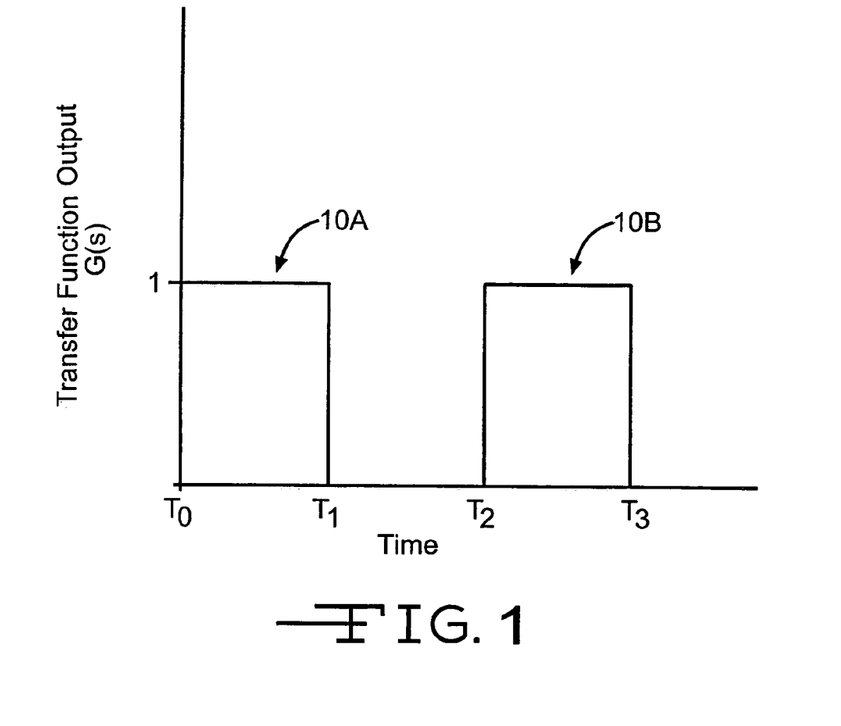
FIG. 1 is a graphical representation of an unfiltered control input.
Figure 2:
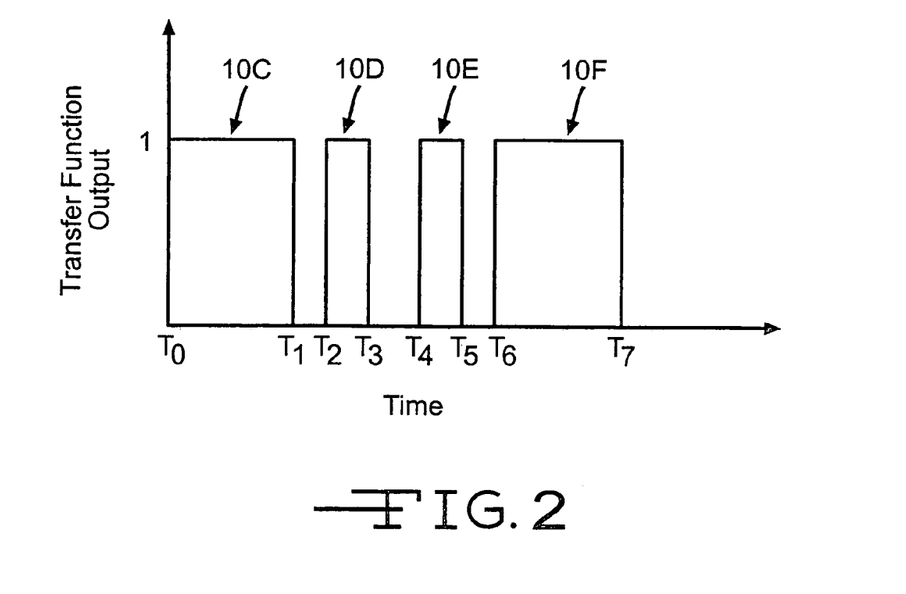
FIG. 2 is a graphical representation of an unfiltered control input.

FIG. 1 graphically shows the output of the transfer function when the input is a unit step. It should be noted that transfer functions need not define identical pulses 10A, 10B. FIG. 2 shows a possible transfer function where the pulses 10C, 10D, 10E, 10F, are not identical.

The transfer function may be coupled with a filter, such as an integrator, to provide an augmented transfer function. The augmented transfer function that results from coupling an integrator might be:

$$G(s) = \frac{J}{s}\sum_{i=0}^{N}(-1)^i \exp(-sT_i)$$

Figure 3:
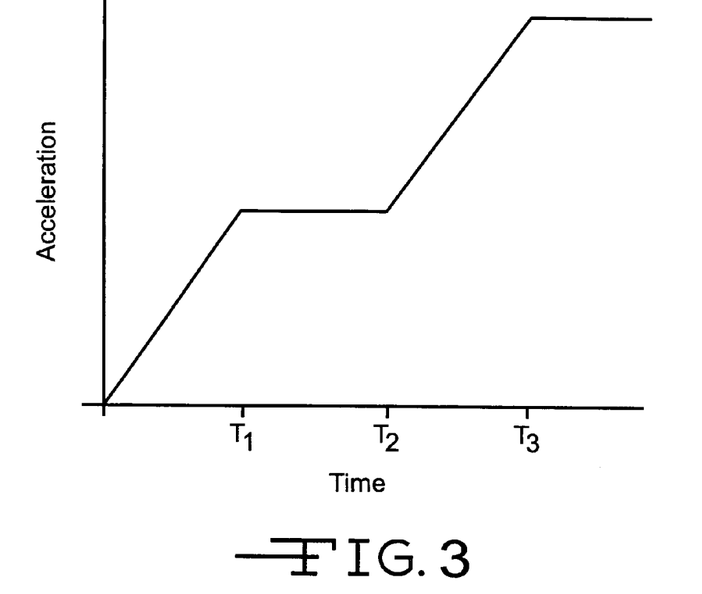
FIG. 3 is an example of a control input that might be created using the invention.

FIG. 3 is a graphical depiction of what the output of the transfer function corresponding to the jerk parameter equation depicted in FIG. 1 might look like after an input signal is acted on by a device operating according to an augmented transfer function, wherein the filter of the augmented transfer function is an integrator.

It may be desirable to desensitize the transfer function to errors arising out of, for example, an incorrect estimate of the damping coefficient or natural frequency. Additional equations may be used to determine the set of $T_i$ values. For example, the set of $T_i$ values may be determined by finding $T_i$ values that provide a solution not only to the jerk parameter equation, the first constraint equation and the second constraint equation, but also provide a solution to one or more desensitizing equations. Such desensitizing equations may require additional pulses in the jerk parameter equation. Two such desensitizing equations may be:

$$\sum_{i=0}^{N}(-1)^i T_i \exp(-\sigma_k T_i)\sin(\omega_k T_i) = 0 \text{ for } k = 1, 2, 3, \ldots$$

and $$\sum_{i=0}^{N}(-1)^i T_i \exp(-\sigma_k T_i)\cos(\omega_k T_i) = 0 \text{ for } k = 1, 2, 3, \ldots$$

The amplitude of the pulses 10 defined by a jerk parameter equation may need to be adjusted in order that use of the corresponding transfer function achieves the desired change in the system. For example, the jerk parameter equation may be modified to require a pulse amplitude greater or less than one that is sufficient to achieve a desired change in the system upon completion of the transfer function. However, it should be noted that if the selected jerk parameter J corresponds to the maximum possible rate of change in acceleration of the system component, then the jerk parameter equation may be modified to require a pulse amplitude equal to or less than one, such that the desired change in the system is achieved upon applying the corresponding transfer function to an input signal to obtain a control input.

When more than one set of $T_i$ values satisfies the three equations, it may be necessary to determine which of the sets of $T_i$ values may provide the best transfer function. To select between sets of $T_i$ values, a total time parameter may be determined for each of the sets of Ti values that satisfy the equations. The total time parameter may be equal to an amount of time needed to execute the corresponding transfer function. For example, the total time parameter corresponding to the control input of FIG. 2 may be determined by subtracting $T_0$ from $T_7$. By comparing the total time parameters, the selected set may be determined to be the set with the smallest total time parameter.

Figure 4:
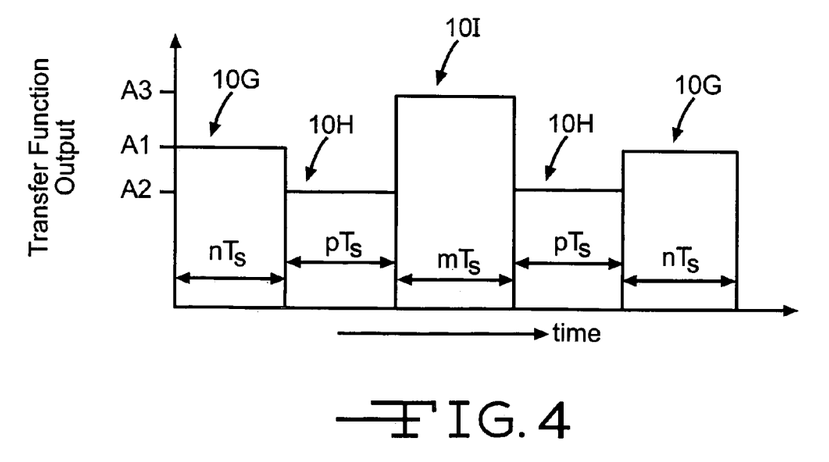
FIG. 4 is a graphical representation of an unfiltered control input.
Figure 5:
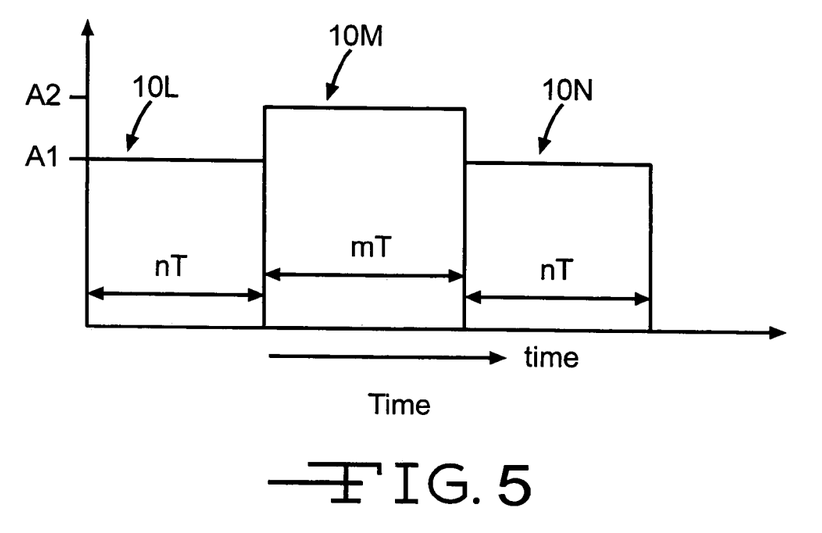
FIG. 5 is a graphical representation of an unfiltered control input.
Figure 6:
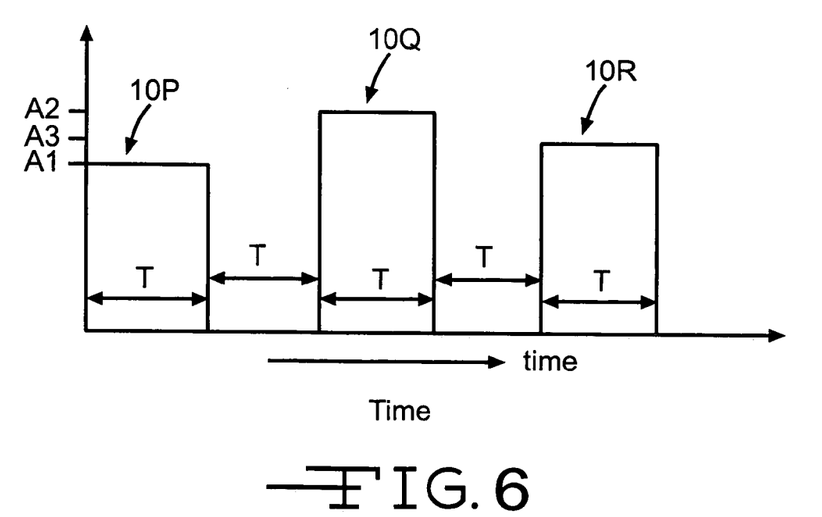
FIG. 6 is a graphical representation of an unfiltered control input.

FIGS. 1 and 2 graphically depict unfiltered control inputs, wherein the pulses 10 were of equal amplitude. The amplitude of the pulses need not be equal. FIGS. 4, 5 and 6 are graphical examples of control inputs where the amplitudes of the pulses are not equal.

For purposes of illustrating a second embodiment of the invention, FIG. 4 will be referenced. FIG. 4 shows three types of pulses 10G, 10H, 10I that correspond to a control input that might be produced by an unfiltered transfer function. However it must be understood that this embodiment may be practiced with more than three pulses 10 being defined by the unfiltered transfer function. For purposes of illustration, a desired time delay is selected, and three equations are determined. A first one of the equations is a jerk parameter equation. The jerk parameter equation may be the following equation:

$$2A_1 nT_s + 2A_2 mT_s + A_3 nT_s = \frac{1}{J}$$

where $T_s$ is the time delay, $A_1$ is a first amplitude, $A_2$ is a second amplitude, $A_3$ is a third amplitude, n is a first time-scaling factor, p is a second time-scaling factor, and m is a third time-scaling factor. FIG. 4 illustrates $A_1$, $A_2$, $A_3$, n, p and m.

In the example method corresponding to the second embodiment of the invention, a second one of the equations may be a first constraint equation. The first constraint equation may be:

$$A_1 - (A_1 - A_2)\cos(nT_s\omega) - (A_2 - A_3)\cos((n+p)T_s\omega) - (A_3 - A_2)\cos((n+p+m)T_s\omega) - (A_2 - A_1)\cos((n+2p+m)T_s^2\omega) - A_1\cos((2n+2p+m)T_s\omega) = 0$$

A third one of the equations may be a second constraint equation. The second constraint equation may be:

$$-(A_1 - A_2)\sin(nT_s\omega) - (A_2 - A_3)\sin((n+p)T_s\omega) - (A_3 - A_2)\sin((n+p+m)T_s\omega) - (A_2 - A_1)\sin((n+2p+m)T_s\omega) - A_1\sin((2n+2p+m)T_s\omega) = 0$$

These two constraint equations are for an undamped system. Similar equations may be derived for damped systems. Sets that satisfy (a) the jerk parameter equation, (b) the first constraint equation and (c) the second constraint equation may be determined. Each set may be comprised of a value for each of A1, A2, A3, m, n and p. One of the sets may be selected to provide a selected set. The selected set may then be used to determine a corresponding transfer function. The transfer function G(s) may be found using the following equation:

$$G(s) = A_1 - A_1 e^{-snTs} + A_2 e^{-snTs} - A_2 e^{-s(n+p)Ts} + A_3 e^{-s(n+p)Ts} -$$
$$A_3 e^{-s(n+p+m)Ts} + A_2 e^{-s(n+p+m)Ts} - A_2 e^{-s(n+2p+m)Ts} +$$
$$A_1 e^{-s(n+2p+m)Ts} - A_1 e^{-s(2n+2p+m)Ts}$$

A filter may be coupled with the transfer function to provide an augmented transfer function. If an integrator is coupled, then the augmented transfer function might be:

$$G(s) = \frac{J}{s}(A_1 - A_1 e^{-snT_s} + A_2 e^{-snT_s} - A_2 e^{-s(n+p)T_s} +$$
$$A_3 e^{-s(n+p)T_s} - A_3 e^{-s(n+p+m)T_s} + A_2 e^{-s(n+p+m)T_s} -$$
$$A_2 e^{-s(n+2p+m)T_s} + A_1 e^{-s(n+2p+m)T_s} - A_1 e^{-s(2n+2p+m)T_s})$$

In the second embodiment, more than one set may satisfy the three equations, and so it may be necessary to determine which of the sets may provide the best transfer function. To select between sets, a total time parameter may be determined in a manner similar to that described above. For example, the total time parameter may be equal to an amount of time needed to execute the corresponding transfer function, and by comparing the total time parameters of each set, the selected set may be determined to be the set with the smallest total time parameter.

Another manner of selecting a set for use in determining the transfer function may involve determining a sensitivity factor. The sensitivity factor may be a measure of how the system may respond if the transfer function is not executed properly. For example, a low sensitivity factor may indicate that the system will not deviate significantly from the predicted response if the transfer function is not executed exactly. A high sensitivity factor may indicate the system will deviate significantly from the predicted response if the transfer function is not executed exactly. For example, the sensitivity factor may be determined by the following sensitivity factor equation:

$$f = \sum_{\omega=\omega_l}^{\omega=\omega_h} \text{abs}\begin{pmatrix} A_1(1 - \exp(nT_s j\omega)) + \\ A_2 \exp(-(n+p)T_s j\omega)(1 - \exp(-mT_s j\omega)) + \\ A_3 \exp(-(n+2p+m)T_s j\omega)(1 - \exp(-nT_s j\omega)) \end{pmatrix}$$

where $\omega_h$ is a high natural frequency and $\omega_l$ is a low natural frequency, $\omega_h$ and $\omega_l$ defining a range of frequencies where the natural frequency is believed to occur. As such, the sensitivity factor equation is designed to produce an indication of the ability of the system to tolerate deviations from a desired control input. The selected set may be a set having a smallest sensitivity factor.

The total time parameter and the sensitivity factor methods of selecting a set may be used together. For example, a group of sets may be identified wherein each set in the group has a total time parameter that is the smallest total time parameter. Then a sensitivity factor may be determined for sets in the group, and a set having the smallest sensitivity factor may be selected. In this manner, the selected set will not only have a total time parameter that is the smallest, but the selected set will also have a sensitivity factor that is the smallest.

It should be noted that although the drawings and equations illustrating the invention have only pulses 10 with a positive amplitude, the invention is not limited to pulses 10 having a positive amplitude. One or more of the pulses 10 may have a negative amplitude.

Figure 7:
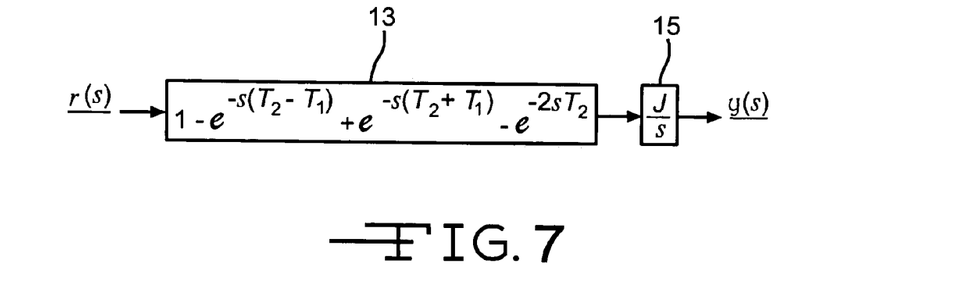
FIG. 7 is a schematic of a time delay system according to the invention wherein an integrator is used as a filter.
Figure 8:
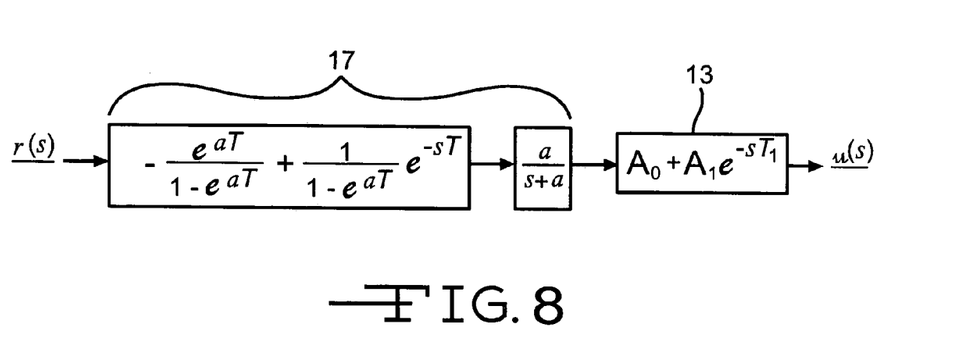
FIG. 8 is a schematic of a time delay system according to the invention which includes a first order filter.
Figure 9:
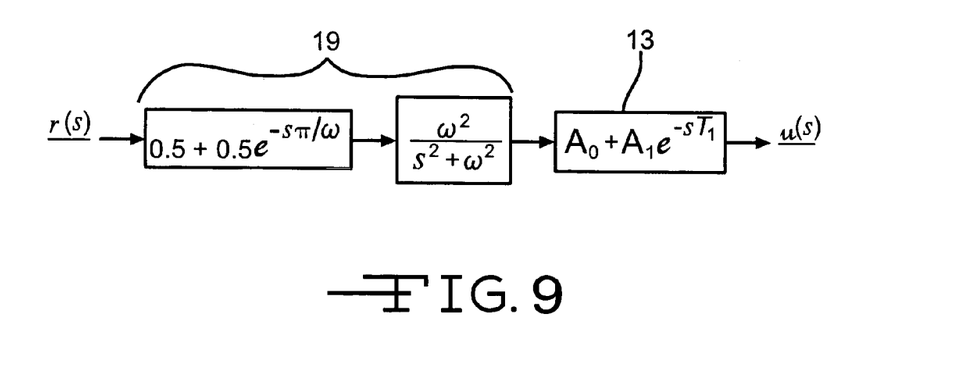
FIG. 9 is a schematic of a time delay system according to the invention which includes a sinusoidal filter.
Figure 10:
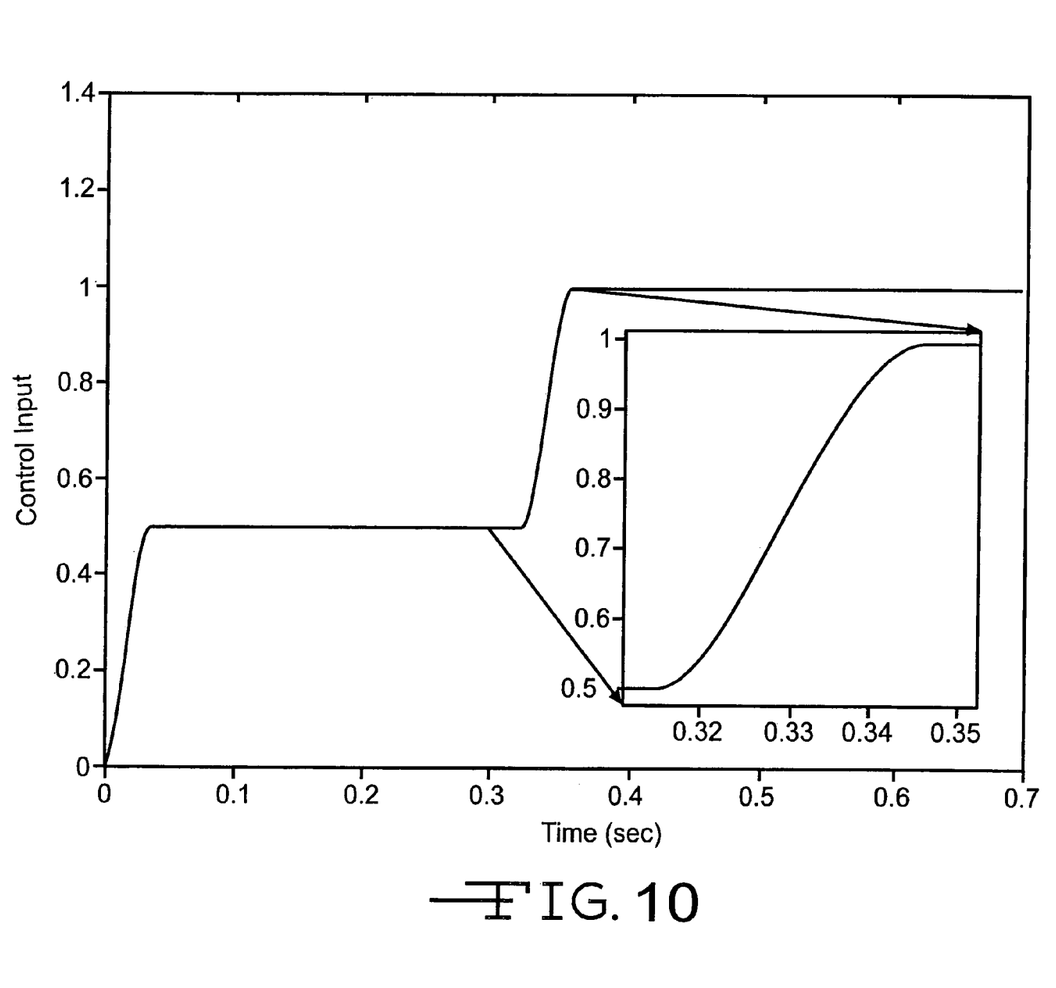
FIG. 10 is a graph of a control input that might be created using the invention.

Once the transfer function is determined, it may be coupled with a filter to provide an augmented transfer function. The filter may be, for example, an integrator, a first order filter or a sinusoidal filter. FIG. 7 illustrates a transfer function 13 coupled with an integrator 15, FIG. 8 illustrates a transfer function 13 coupled with a first order filter 17, and FIG. 9 illustrates a transfer function 13 coupled with a sinusoidal filter 19. An input signal "r(s)" may be provided and acted upon in accordance with the augmented transfer function to provide a control input signal "u(s)." The control input signal may be, for example, the acceleration of a system component. FIG. 10 illustrates such a control input signal where a sinusoidal filter was coupled with the transfer function. The control input signal may be used to adjust the system component such that the system is brought from a first state to a second state.

Although the present invention has been described with respect to one or more particular embodiments, it will be understood that other embodiments of the present invention may be made without departing from the spirit and scope of the present invention. Hence, the present invention is deemed limited only by the appended claims and the reasonable interpretation thereof.

What is claimed is:
1. A method of determining a control input signal, comprising:
   determining a jerk parameter equation, the jerk parameter equation being

$$\sum_{i=0}^{N}(-1)^{i+1}T_i = \frac{1}{J}$$

determining a first constraint equation, the first constraint equation being $$\sum_{i=0}^{N}(-1)^i \exp(-\sigma_k T_i)\cos(\omega_k T_i) = 0 \text{ for } k = 1, 2, 3, \ldots$$

determining a second constraint equation, the second constraint equation being $$\sum_{i=0}^{N}(-1)^i \exp(-\sigma_k T_i)\sin(\omega_k T_i) = 0 \text{ for } k = 1, 2, 3, \ldots$$

determining a set of $T_i$ values that provides a solution for each of (a) the jerk parameter equation, (b) the first constraint equation and (c) the second constraint equation;
   selecting the set of $T_i$ values to provide a selected set;
   using the selected set to determine a corresponding transfer function according to the following equation;

$$G(s) = \sum_{i=0}^{N}(-1)^i \exp(-sT_i)$$

coupling the transfer function with a filter function to provide an augmented transfer function; and
   acting upon an input signal according to the augmented transfer function to provide a control input signal,
wherein N is an odd integer, J is the jerk parameter, $\sigma_k$ is the real part of the $k^{th}$ underdamped pole, and $\omega$ is the $k^{th}$ natural frequency of a system being controlled.

2. The method of claim 1, wherein the transfer function includes a pulse, and an amplitude of the pulse is selected to achieve a desired change in the system upon completion of the control input signal.

3. The method of claim 1, wherein selecting the set of $T_i$ values to provide a selected set is accomplished by:
   determining a total time parameter for the selected set, the total time parameter being equal to an amount of time needed to execute the corresponding transfer function; and
   comparing the total time parameter of the selected set to determine that the selected set has a smallest total time parameter.

4. The method of claim 1, wherein the set of $T_i$ values provides a solution to a desensitizing equation, in addition to the jerk parameter equation, the first constraint equation and the second constraint equation.

5. The method of claim 4, wherein the desensitizing equation is:

$$\sum_{i=0}^{N}(-1)^i T_i \exp(-\sigma_k T_i)\sin(\omega_k T_i) = 0 \text{ for } k = 1, 2, 3, \ldots$$

and the set of $T_i$ values provides a solution to a further desensitizing equation, the further desensitizing equation being $$\sum_{i=0}^{N}(-1)^i T_i \exp(-\sigma_k T_i)\cos(\omega_k T_i) = 0 \text{ for } k = 1, 2, 3, \ldots$$

6. The method of claim 1, wherein the filter is an integrator.

7. The method of claim 1, wherein the filter is a first order filter.

8. The method of claim 1, wherein the filter is a sinusoidal filter.

9. A method of determining a control input signal, comprising:
   selecting a desired time delay;
   determining a jerk parameter equation, the jerk parameter equation being $$2A_1 nT_s + 2A_2 mT_s + A_3 nT_s = \frac{1}{J}$$

determining a first constraint equation, the first constraint equation being $A_1 - (A_1-A_2)\cos(nT_s\omega) - (A_2-A_3)\cos((n+p)T_s\omega) - (A_3-A_2)\cos((n+p+m)T_s\omega) - (A_2-A_1)\cos((n+2p+m)T_s\omega) - A_1\cos((2n+2p+m)T_s\omega) = 0$ determining a second constraint equation, the second constraint equation being $-(A_1-A_2)\sin(nT_s\omega) - (A_2-A_3)\sin((n+p)T_s\omega) - (A_3-A_2)\sin((n+p+m)T_s\omega) - (A_2-A_1)\sin((n+2p+m)T_s\omega) - A_1\sin((2n+2p+m)T_s\omega) = 0$ determining a set that satisfies (a) the jerk parameter equation, (b) the first constraint equation and (c) the second constraint equation, each set comprising a value for each of A1, A2, A3, m, n and p;
   selecting the set to provide a selected set;
   using the selected set to determine a corresponding transfer function according to the following equation $G(s) = A_1 - A_1 e^{-snT_s} - A_2 e^{-s(n+p)T_s} + A_3 e^{-s(n+p)T_s} - A_3 e^{-s(n+p+m)T_s} + A_2 e^{-s(n+p+m)T_s} - A_2 e^{-s(n+2p+m)T_s} + A_1 e^{-s(n+2p+m)T_s} - A_1 e^{-s(2n+2p+m)T_s}$ coupling the transfer function with a filter function to provide an augmented transfer function; and
   acting upon an input signal according to the augmented transfer function to provide a control input signal,
wherein J is the jerk parameter, $\sigma_k$ is the real part of the $k^{th}$ underdamped pole, and $\omega$ is the $k^{th}$ natural frequency of a system being controlled.

10. The method of claim 9, wherein selecting the set to provide a selected set is accomplished by:
   determining a total time parameter for the selected set, the total time parameter corresponding to an amount of time needed to execute the corresponding transfer function; and comparing the total time parameter of the selected set to determine that the selected set has a smallest total time parameter.

11. The method of claim 9, wherein selecting the set to provide a selected set is accomplished by:
determining a sensitivity factor for the selected set, the sensitivity factor being determined by:

$$f = \sum_{\omega=\omega_l}^{\omega=\omega_h} \text{abs}\begin{pmatrix} A_1(1-\exp(-nT_sj\omega)) + \\ A_2\exp(-(n+p)T_sj\omega)(1-\exp(-mT_sj\omega)) + \\ A_3\exp(-(n+2p+m)T_sj\omega)(1-\exp(-nT_sj\omega)) \end{pmatrix}$$

comparing the sensitivity factor of the selected set to determine that the selected set has a smallest sensitivity factor.

12. The method of claim 9, wherein the filter is an integrator.

13. The method of claim 9, wherein the filter is a first order filter.

14. The method of claim 9, wherein the filter is a sinusoidal filter.

15. A method of generating an input to a system, comprising:
determining a jerk parameter equation, the jerk parameter equation describing the rate of change of the acceleration of a component of the system from a first state to a second state;
determining a first constraint equation and a second constraint equation, the constraint equations describing how poles of the jerk parameter equation may be canceled;
determining a set of amplitudes (A1, A2, A3) and time scaling factors (n, p, m) that provides a solution for each of (a) the jerk parameter equation, (b) the first constraint equation and (c) the second constraint equation;
selecting the set of amplitudes and time scaling factors to provide a selected set;
using the selected set to determine a corresponding transfer function according to the following equation $$G(s) = A_1 - A_1 e^{-snT_s} + A_2 e^{-snT_s} - A_2 e^{-s(n+p)T_s} + A_3 e^{-s(n+p)T_s} - A_3 e^{-s(n+p+m)T_s} + A_2 e^{-s(n+p+m)T_s} - A_2 e^{-s(n+2p+m)T_s} + A_1 e^{-s(n+2p+m)T_s} - A_1 e^{-s(2n+2p+m)T_s}$$

coupling the transfer function with a filter function to provide an augmented transfer function; and
acting upon an input signal according to the augmented transfer function to provide a control input signal.

16. The method of claim 15, wherein selecting one of the sets to provide a selected set is accomplished by:
determining a total time parameter for the selected set, the total time parameter corresponding to an amount of time needed to execute the corresponding transfer function; and
comparing the total time parameter of the selected set to determine that the selected set has a smallest total time parameter.

17. The method of claim 15, wherein selecting one of the sets to provide a selected set is accomplished by:
determining a sensitivity factor equation, the sensitivity factor equation being able to produce a sensitivity factor indicating an ability of the system to tolerate deviations;
determining a sensitivity factor for the selected set; and
comparing the sensitivity factor of the selected set to determine that the selected set has a smallest sensitivity factor.

18. The method of claim 17, wherein the sensitivity factor equation is $$f = \sum_{\omega=\omega_l}^{\omega=\omega_h} \text{abs}\begin{pmatrix} A_1(1-\exp(-nT_sj\omega)) + \\ A_2\exp(-(n+p)T_sj\omega)(1-\exp(-mT_sj\omega)) + \\ A_3\exp(-(n+2p+m)T_sj\omega)(1-\exp(-nT_sj\omega)) \end{pmatrix}.$$

19. The method of claim 15, wherein the filter is an integrator.

20. The method of claim 15, wherein the filter is a first order filter.

21. The method of claim 15, wherein the filter is a sinusoidal filter.

* * * * *